Oct. 10, 1961  W. G. PATRIQUIN  3,003,595
SHOCK ABSORBERS
Filed March 6, 1959  4 Sheets-Sheet 3

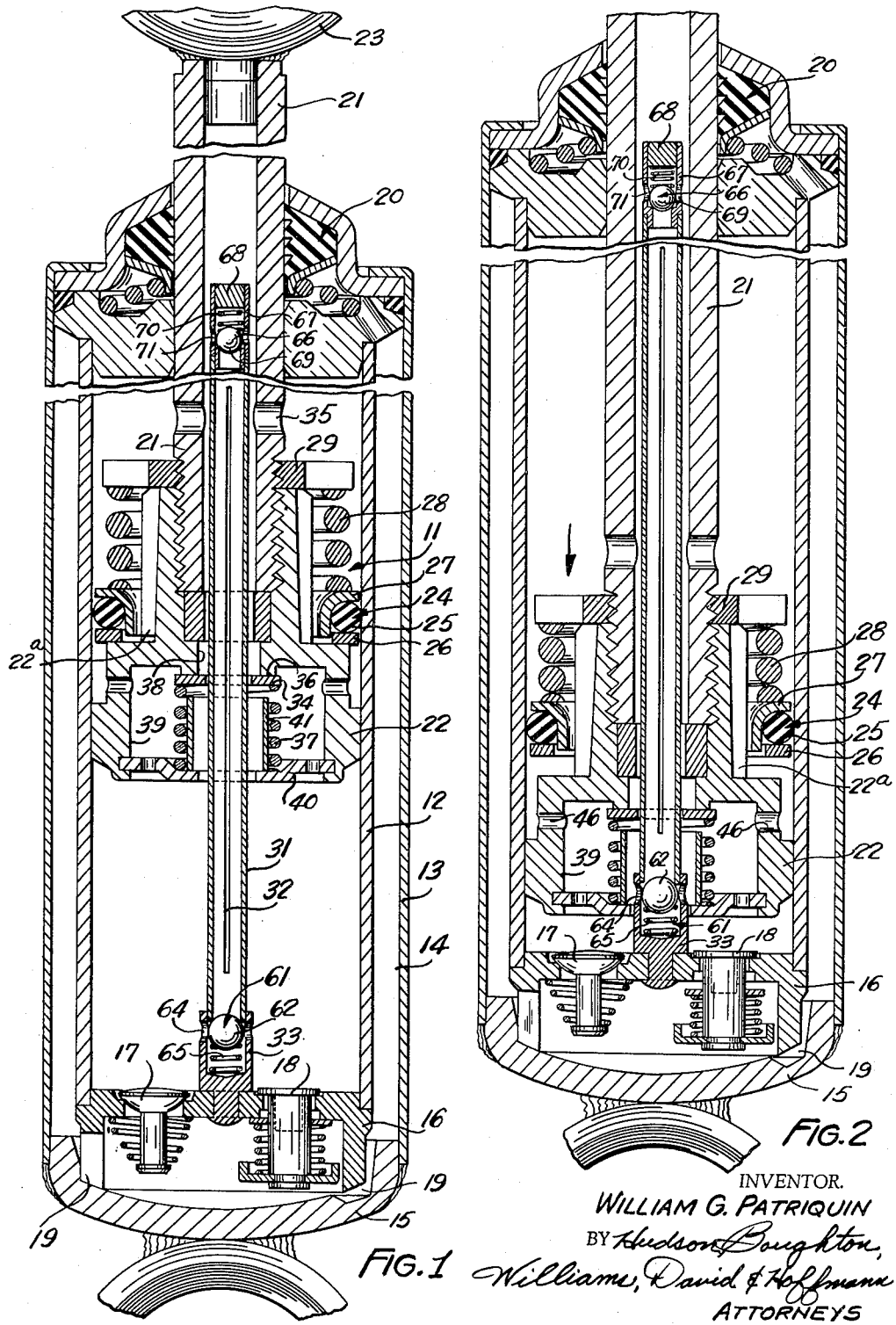

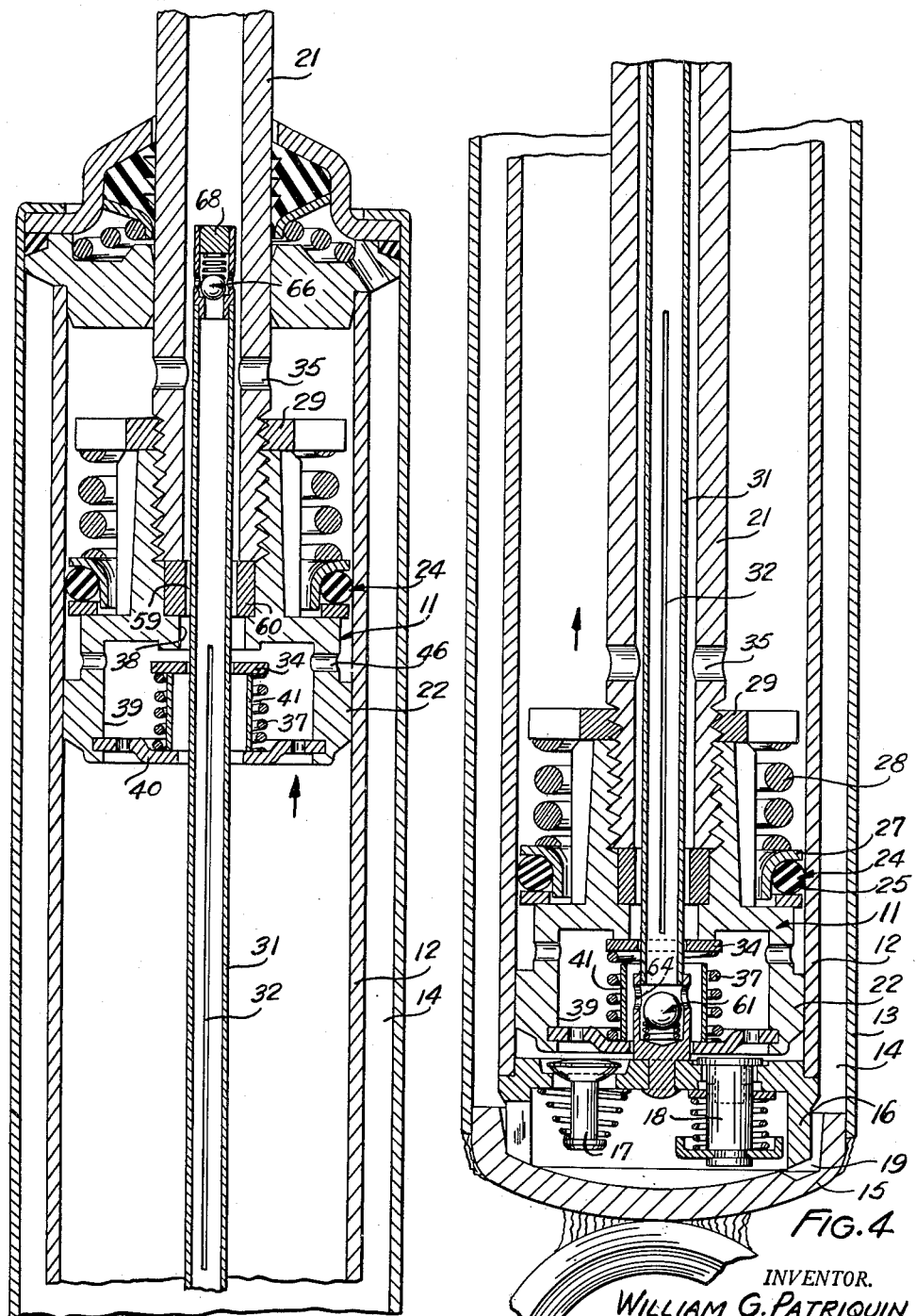

INVENTOR.
WILLIAM G. PATRIQUIN
BY Hudson, Creighton,
Williams, David & Hoffmann
ATTORNEYS

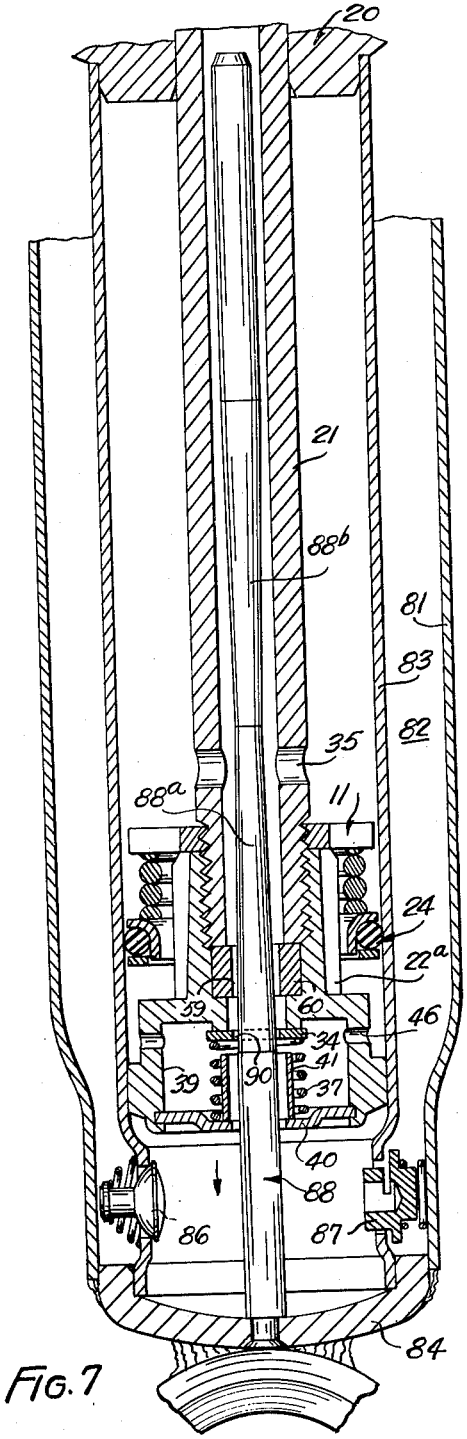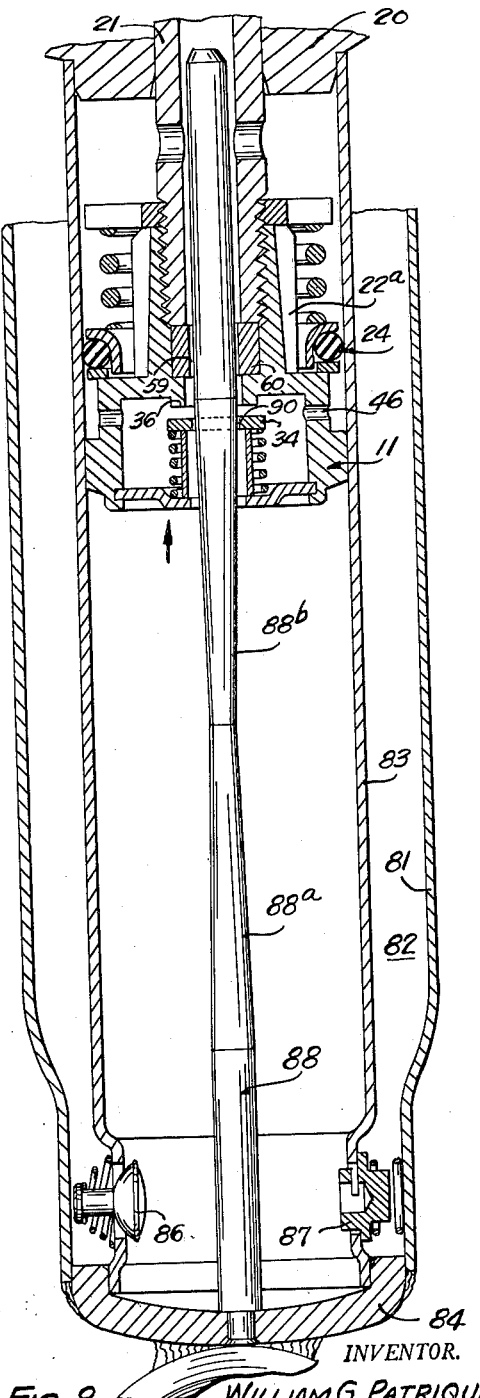

United States Patent Office 3,003,595
Patented Oct. 10, 1961

3,003,595
SHOCK ABSORBERS
William G. Patriquin, Willoughby, Ohio, assignor to The Gabriel Company, Cleveland, Ohio, a corporation of Ohio
Filed Mar. 6, 1959, Ser. No. 797,801
13 Claims. (Cl. 188—88)

The present invention relates to a shock absorber and particularly to a direct-acting fluid shock absorber. Inasmuch as the invention is particularly useful when employed in a direct double-acting hydraulic shock absorber it will be so described herein by way of illustration but not by way of limitation.

One of the principal objects of the present invention is to provide a novel position-sensitive, direction-sensitive, or displacement-sensitive shock absorber.

Another object of the invention is to provide a shock absorber that softly cushions small bumps or vibrations and also provides predetermined increasing and decreasing resistance to uniformly increasing and decreasing changes, respectively, in distance between the sprung and unsprung parts of a vehicle or other apparatus.

An additional object of the new and improved shock absorber is to provide a soft cushion when the sprung and unsprung parts, to which the shock absorber is adapted to be connected, are separated a substantially normal distance, and which shock absorber increasingly resists movement of the sprung and unsprung parts away from the normal spacing thereof.

A still further object of the present invention is to provide a position-sensitive, direction-sensitive, or displacement-sensitive shock absorber which has a positively controlled variable area valving arrangement that increasingly restricts the flow of fluid therethrough as the degree of jouncing and rebounding increases.

Another object of the invention is to provide a position-sensitive, direction-sensitive, or displacement-sensitive shock absorber having mechanically controlled variably restricted orifice means for providing a relatively soft cushion in its initial position, but which shock absorber increasingly resists, at a predetermined rate, an increase or decrease in distance away from the initial position or spacing between the sprung and unsprung parts of a vehicle or other apparatus mounting the shock absorber.

The invention further resides in certain novel features of construction, combinations and arrangements of parts, and further objects and advantages of the invention will be apparent to those skilled in the art to which it pertains from the following description of the present preferred embodiments thereof described with reference to the accompanying drawings, which form a part of this specification, and wherein the same reference characters represent corresponding parts throughout the various views, and in which:

FIG. 1 is a longitudinal sectional view of a direct double-acting telescoping hydraulic shock absorber embodying a preferred form of the invention with the piston in its initial operating position in a working cylinder;

FIG. 2 is a view similar to FIG. 1 with the shock absorber piston shown substantialy at the end of a compression or impact stroke in the working cylinder but not with the piston bottomed in the working cylinder;

FIG. 3 is a view similar to FIG. 1 but with the piston shown near the end of a rebound or recoil stroke at the upper end of the working cylinder;

FIG. 4 is a view similar to FIG. 2 but with the piston shown at the start of its recoil or rebound stroke following a maximum compresison or impact stroke;

FIG. 7 is another view of the modification of FIG. 6 but shows the piston near the end of a compression or impact stroke; and FIG. 8 is another view of the modification of FIG. 6 but shows the piston near the end of its rebound or recoil stroke.

Figure 5:
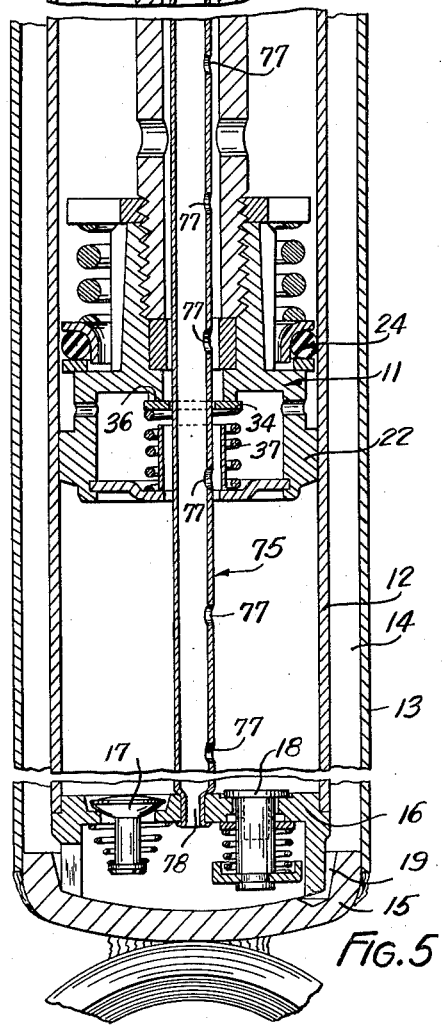
FIG. 5 is a view similar to FIG. 1 but embodying a modification of the invention and shows the piston of the shock absorber in its initial operating position.

In the following description, the elongation of the shock absorber is referred to as a recoil or rebound stroke and the collapse or the partial collapse of the shock absorber is referred to as a compression or impact stroke.

Referring to FIGS. 1 to 4, the double-acting hydraulic shock absorber comprises a piston assembly 11 reciprocably disposed in a working cylinder 12 which is concentrically secured in radially spaced relationship in a casing or housing 13 to provide an annular reservoir therebetween.

A cup-shaped lower end closure cap 15 provided with an eye-ring is welded or otherwise secured within the lower end of the casing 13. The eye-ring can be connected to an unsprung vehicle part. The working or inner cylinder 12 has a compression valve head assembly 16 rigidly secured within the lower end thereof preferably by means of a rabbet joint. The usual replenishing valve 17 and impact valve 18 are diametrically oppositely disposed in the impact head 16 with the spring portions thereof substantially enclosed by a cylindrical skirt depending from the compression head 16. The cylindrical skirt of the head 16 is telescopically disposed within and rigidly secured to the closure cap 15 so as to connect the working cylinder therewith. It will be understood that the replenishing valve 17 and the impact valve 18 perform the usual functions understood to those skilled in the art. The lower side of compression head 16 and the reservoir 14 communicate with each other by means of passages 19 formed between the skirt of the head 16 and the closure cap 15. The compression head valve assembly is described in detail in U.S. Patent No. 2,518,553 dated August 15, 1950.

The upper ends of the working cylinder 12 and the casing 13 are sealed by conventional closure means 20 substantially like that shown in U.S. Patent No. 2,599,477 dated June 3, 1952, but with minor variations. The closure means 20 does not form any part of the invention and therefore will not be described in detail herein.

The piston assembly 11 is comprised of a tubular or hollow piston rod 21 and a cylindrical piston 22, of stepped configuration, threaded onto the lower end of the piston rod 21. The upper end of the piston rod 21 slidably extends through the closure means 20 in a known manner and an eye-ring 23 is rigidly secured to the upper end of the rod 21 in such a manner as to permit the upper end thereof to be connected to a sprung vehicle part.

An O-ring piston packing and compression or impact valve arrangement 24 is provided on the piston 22 to permit pressure fluid to pass from the lower chamber to the upper chamber in the working cylinder 12, when a predetermined pressure obtains in the lower chamber.

The O-ring valve arrangement 24 is shown in U.S. Patent No. 2,507,267, dated May 9, 1950, and comprises a nonmetallic O-ring packing and valve member 25 sandwiched between an annular flat disk 26 and a carrier 27. A spring 28 bears against the radial flange portion of the carrier 27 and against a generally star-shaped nut 29 screwed on the piston rod 21. This portion of the piston is well known and, hence, need not be described in greater detail.

The upper radially reduced portion of the piston 22 is provided with longitudinally extending circularly spaced slots 22a for permitting the passage of fluid from the lower side of the O-ring 25 to the upper side thereof.

An upwardly extending hollow metering rod or tube 31 having valve-controlled orifice means, such as a longitudinally extending slit 32 formed therein, extends from the head 16 coaxially of the piston and piston rod. The lower end of the tube 31 is rigidly secured in a cylindrical bore of a generally cup-shaped mounting pin 33 that is rigidly secured to the impact or compression head 16. The upper end of the tube 31 freely extends into the elongated bore of the piston rod 21 and preferably extends into the closure means 20. The shock absorber is shown disposed in an initial position in FIG. 1 which, in this instance, may be assumed as disposed midway between the ends of the working cylinder 12, and more specifically when the recoil ring disk valve 34 carried by the piston 22 and freely slidably surrounding the tube 31 is substantially midway between the ends of the slit 32 therein.

The transfer of fluid from the lower side of piston 22 is effected during a compression or impact stroke of piston 22 by the flow of fluid into the tube 31 by way of the slit 32, traveling upwardly in the tube 31 past the recoil valve 34, out of the upper portion of slit 32, into the piston rod 21 and out of the piston rod 21 by way of one or more ports 35 above the piston 22. It will be apparent that the length of the slit 32 below the recoil valve 34 will be the controlling factor in the volume of fluid which can be transferred from the lower side of the piston to the upper side thereof. More especially, the effective slit orifice permitting the transfer of fluid from the lower side of the piston to the upper side in a given length of time is one of the determining factors as to whether the shock absorber will provide a soft or hard ride by providing a variable resistance to an impact force. As the recoil valve 34 and piston 22 move from their initial position, illustrated in FIG. 1, the effective size of the orifice or slit 32 will be reduced and, accordingly, a reduced amount of fluid will be permitted to enter the tube 31 from the working cylinder below the piston 22 during the compression stroke. It may be said that the quantity of fluid thus flowing into the tube 31 is increasingly reduced at a predetermined rate.

During the compression stroke of the piston 22, the recoil valve 34 is held against an annular valve seat 36 by means of a helical spring 37. The valve seat 36 is at the lower end of a central bore which forms a passage 38 in the piston 22. The passage 38 is smaller in diameter than the communicating counterbore in the lower face of piston 22.

The spring 37 is between the lower side of recoil valve 34 and a retainer disk 40 secured to the piston in the lower end of the counterbore 39. The disk 40 has one or more circularly spaced openings and a central larger opening through which freely extends the tube 31.

A cylindrical sleeve 41 carried by the disk 40 is surrounded by the spring 37 and functions as a stop for the recoil valve 34 that limits the downward unseating movement of the recoil valve 34.

During the compression or impact stroke of the piston 22, it will be understood that the impact valve 18 will be opened and a quantity of fluid equal to the volume displaced by the incoming piston rod 21 will be forced out of the lower chamber into the reservoir 14. However, a sufficient amount of fluid must flow into the upper chamber above the piston 22 to fill the additional space created in the upper chamber. Most of this required volume of fluid will be forced through the lower portion of the slit 32 into the tube 31 and out of the tube 31 through the upper portion of slit 32. No appreciable volume of fluid will pass between the tube 31 and the recoil valve 34 since these parts have a sliding fit. When a predetermined pressure is reached in the lower chamber, the impact O-ring valve 25 will unseat against the load of spring 28 and an additional volume of fluid can pass from the lower to the upper chamber. It will be seen that the length of the slit 32 below the recoil valve 34 will be the primary controlling orifice during the impact stroke.

As pointed out, the variable area restriction of fluid from one side of the piston 22 to the other side thereof during a compression or impact stroke is determined by the lengths of the two portions of the slit 32 extending from the recoil valve 34. When the piston 22 moves downwardly relative to the tube 31 during a compression or impact stroke, the seated recoil valve decreases the effective length of the lower slit portion of the tube 31. It is apparent then, that during a compression stroke of the piston 22 the controlling slit portion is that part of the slit extending downwardly from the recoil valve 34. Accordingly, as the piston 22 moves downwardly increment by increment, the total area of the controlling slit portion is reduced at a predetermined rate.

FIG. 2 shows the piston 22 at the end of a long compression stroke, but not bottomed in the working cylinder 12. From this posture it is apparent that only a very small quantity of fluid is permitted to be metered from the lower side of piston 22 to the upper side thereof through the lower portion of slit 32 which is reduced now to a very short portion.

Should the compression stroke be of a nature causing the piston 22 to be substantially bottomed in the cylinder 12, the recoil valve 34 will be below or at the lower end of the slit 32, as seen in FIG. 4, and the slit 32 is rendered substantially inactive for the upward flow of fluid through the tube 31. As a result, during an impact stroke the piston 22 is not likely to bottom in the working cylinder 12.

One or more ports 46 are formed in the piston 22 and connect the counterbore 39 with the upper side of the piston 22.

Referring to FIG. 3, the piston 22 is shown near the upper end of a rebound or recoil stroke. During the rebound or recoil stroke of the piston 22 in the working cylinder 12, the replenishing valve 17 opens to fill with fluid the void being created in the lower chamber by the upward movement of the piston 22. More specifically, the fluid during the recoil stroke flows from the upper chamber into the radial ports 35 of the piston rod 21, into the tube 31 by way of the upper portion of the slit 32 located above the recoil valve 34, through the tube 31 and out the lower portion of the slit 32 into the lower chamber. In addition, a certain quantity of hydraulic fluid will flow between the wall of the central opening in the piston rod 21 and the outer wall of the tube 31, and through a clearance 59 between a metering ring 60. The metering ring 60 is comprised of a cylindrical sleeve insert secured in an enlarged opening between the lower terminal end of the piston rod 21 and the upper end of the passage 38 in the piston 22. The clearance 59 in some instances may be such as to have no controlling effect on the volume of fluid that will flow therethrough from one side of the piston 22 to the other side thereof, while in other instances it may be desirable to size it to have such effect. The fluid passing through the clearance 59 acts against the upper surface of the recoil valve 34 to unseat the same when a predetermined pressure obtains.

During the recoil stroke the changing length of the slit 32 above the recoil valve 34 becomes the primary controlling factor in the resistance acting against piston movement. The recoil valve 34 is a secondary controlling factor.

It will be seen from the description thus far set forth that the provision of the tube 31 and the slit 32 effects a primary control during both impact and recoil strokes of the piston which is responsive or sensitive to the position and direction of movement of the piston.

Relief valve means has been provided for expediting the start of the return movement of the piston from a long compression or rebound stroke. As shown in FIGS. 1 to 4, there are relief valves at the opposite ends of the tube 31 and axially spaced beyond the opposite ends of the slit 32.

The relief valve means 61 for speeding the return of the piston 22 towards its initial position after a long compression stroke comprises a spring-pressed ball 62 normally seated against and closing the lower end of the tube 31. The ball 62 is disposed within a cup-shaped portion of the pin 33 which is provided with one or more openings or ports 64. The ball 62, which is urged normally against the end of the tube 31 by means of a spring 65, controls the communication of the ports 64 with the inside of the tube 31.

During the initial period of recovery of the piston 22, and more particularly during the start of a rapid recoil of the piston 22 from a long compression stroke, the initial surge of fluid from the upper side of the piston 22 through the tube 31 cannot escape from the lower end of the tube 31 since the slit 32 is substantially all above the recoil valve 34. Pressure is thus built up in the tube which causes valve 62 to unseat and permit the flow of fluid through the tube 31 to the lower side of the piston assembly 11 by way of ports 64. (See FIG. 4.) It will be understood that the strength of spring 65 is predetermined to prevent the unseating of the valve 62 under normal operating pressures in the tube 31.

Similar relief valve means 66 in the upper end of the tube 31 is effective for facilitating the start of the return movement of the piston assembly 11 after a long rebound or recoil stroke. The relief valve 66 is comprised of a cylindrical tubular housing 67 with a necked lower terminal end portion for being press fitted into the upper end of the tube 31. The connection of the housing 67 with the tube 31 is preferably a rabbet joint. The upper end of the valve housing 67 is plugged with a cylindrical or disk-shaped member 68, so as to provide a spring seat at the upper end thereof. The valve 66 is comprised of a ball 69 adapted to be seated on an annular valve seat formed by the interior of the necked portion of the housing 67 and pressed into sealing engagement therewith by means of spring 70. The spring-pressed ball 69 controls the communication of the interior of tube 31 with the coaxial opening or passage in the piston rod 21 through one or more openings or ports 71 formed in the wall of the housing member 67.

The relief valve means 66 functions to facilitate the start of the return movement of the piston after a long recoil stroke similarly as does the relief valve means 61 after a long impact or compression stroke.

Referring to FIG. 5, a further embodiment of the invention is disclosed wherein the slit tube 31 has been replaced with a tube 75 which has a plurality of axially spaced circular ports or apertures 77 adapted to be successively positioned above or below the recoil valve 34 as the piston moves downwardly or upwardly during its impact or recoil stroke.

The tube 75 has its lower end rigidly secured in the center of the impact head 16. The lower end of the tube 75 is necked-in and extends through the head 16 and forms a predetermined fixed orifice 78, placing the interior of the tube 75 in communication with the space below the head 16.

The shock absorber of FIG. 5 functions substantially the same as the shock absorber of FIGS. 1 to 4, incl. It will be understood that the axially spaced ports 77 of the tube 75 functionally correspond to the slit 32 of tube 31.

Figure 6:
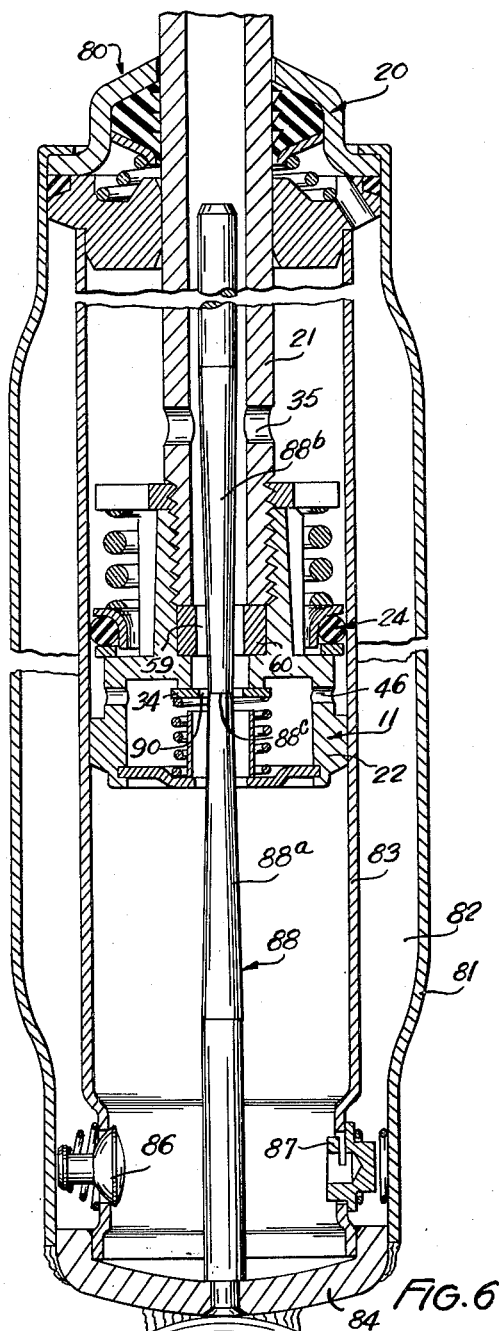
FIG. 6 is a longitudinal sectional view of another shock absorber embodying a still further modification of the invention and with the piston of the shock absorber shown in initial operating position.

The shock absorber of FIGS. 6 to 8, indicated generally by the reference numeral 80, has a differently shaped casing 81 than the casing 13 in the preceding embodiments in that the casing 81 has a diametrically enlarged mid-portion for providing a sufficiently large reservoir 82 between it and a working cylinder 83. The lower end of the casing 81 is closed by means of a ring carrying closure cap 84, and the upper end of the casing 81 is closed by the usual closure means 20.

In the lower end of the working cylinder 83 is formed a necked-in cylindrical band portion provided with diametrically opposed replenishing valve 86 and impact valve 87.

The piston assembly 11 is slidably disposed for reciprocation in the working cylinder 83 between the shoulder formed by the neck-in portion in the working cylinder 83 and the closure means 20 in the upper cylinder 83. The piston assembly 11 is substantially identical to that disclosed in FIGS. 1 to 3.

In FIGS. 6 to 8 an upwardly extending metering rod 88 has its lower end rigidly secured in the center of closure cap 84 and projects through the piston and into the piston rod. The end portions of the rod 88 are substantially cylindrical. However, the middle portion of the metering rod 88 is formed with tapering or frustoconical portions 88a and 88b. The tapering portions 88a and 88b are oppositely inclined toward each other and intersect each other at a central of medial portion 88c. The medial portion 88c is surrounded by the recoil valve 34 when the piston is in the position shown in FIG. 6 and there is a predetermined annular clearance between the portion 88c and the valve 34.

Although the portions 88a and 88b are described as being of the same length and having the same taper, it is understood that one of the portions may have a greater or lesser taper than the other and the over-all length of the tapered portions may be varied, as desired.

A clearance 90 between the rod 88 and the recoil valve 34 is greatest when the piston assembly 11 is in the position shown in FIG. 6. As the piston assembly 11 moves upwardly and downwardly relative to the rod 88 away from the position of FIG. 6 toward the positions of FIG. 8 or FIG 7, the clearance 90 is increasingly restricted or reduced in area. Accordingly, as the piston assembly 11 moves away from its central position, the clearance 90 is increasingly restricted at a predetermined rate. The clearance 90 between the recoil valve 34 and the rod 88 is the primary control passage or orifice through which fluid may be transferred from one side of the piston assembly 11 to the other side thereof. The controlling or metering feature of clearance 59 between the metering ring 60 and the rod 88 is a secondary control passage.

The radial ports 35 in the piston rod 21 are of sufficient size and the clearance between the upper end of the rod 88 and the inner wall of the piston rod 21 is sufficiently great that they will not be the substantially controlling factors in the rebound or the compression stroke of the piston in the cylinder.

FIG. 7 shows the piston assembly 11 near the bottom of the working cylinder 83 substantially at the end of a compression or impact stroke and with the O-ring impact valve 24 of the piston unseated. At this time, the recoil valve 34 is at or adjacent to the lower end of the tapered portion 88a of the rod 88 so that the flow of fluid between the valve 34 and the tapered portion 88a is highly restricted and the only substantial fluid flow from the lower side of the piston 22 to the upper side is by way of the O-ring impact valve 24. This flow takes place through the central opening in the retainer disk 40 into the counterbore 39, out of ports 46, beneath the valve 24, upwardly through the circularly spaced slots 22a and past the star-shaped nut 29 into the upper chamber over the piston 22. This disk 40, in this instance, does not have the circularly spaced openings of the disks 40 of FIGS. 1 to 5 but only the central opening. The central opening can be sized to form a control orifice taking the place of ring 60. Also, the central opening of the disk 40 can be sized to function conjointly with the ring 60 to provide a control orifice series.

FIG. 8 shows piston assembly 11 near the upper end of a rebound or recoil stroke with the clearance 90 between the recoil valve 34 and the piston rod 88 being of such a size as to highly restrict the flow of hydraulic fluid therethrough, the flow of fluid being from the upper side to the lower side of the piston assembly 11.

Several forms of metering elements, i.e., metering tubes 31 and 75, and rod 88, have been described whereby a position-sensitive, direction-sensitive and displacement-sensitive shock absorber is effective for providing a variable area orifice control in a simple and efficient manner. One of the important features of the invention is that the invention is embodied in a structure that is simple in configuration and which can be easily and economically fabricated.

Another important feature of the invention is that relatively minor bumps and vibrations acting on the shock absorber cause a substantially rapid and unrestricted transfer of hydraulic fluid from one side of the piston to the other side thereof and hence soft shock absorbing action. However, as the bumps and vibrations transferred to the shock absorber become more severe and rapid and result in longer rectilinear displacement of the piston, the controlled orifice means are increasingly restricted by the recoil valve in conjunction with the metering element to provide increased shock absorbing action.

The shock absorbing characteristics of a shock absorber embodying the invention can be varied almost infinitely as desired. This may be accomplished by:

(1) Varying the maximum clearance between the recoil valve and the metering element.

(2) Altering the size and length of the slit, or the size and number of the openings in the metering tube, or changing the shape of the metering rod.

(3) Changing the clearance between the ring 60 or between the retainer disk 40, or both, and the metering element.

(4) Varying the loads provided by the various springs in the shock absorber and changing the sizes of fixed orifices or passages.

Although several embodiments of the invention have been illustrated and described herein, it will be understood that the invention is susceptible of various modifications and adaptations within the scope of the appended claims.

Having described my invention, I claim:

1. A direct double acting hydraulic shock absorber comprising a working cylinder, an outer cylinder providing a reservoir, first closure means for one end of said working cylinder and said outer cylinder, second closure means for the other end of said outer cylinder and said working cylinder, impact and replenishing valve controlled passage means between said working cylinder and said reservoir, a piston reciprocable in said working cylinder and having a central passage therethrough and an annular valve seat intermediate the opposite ends of said piston and surrounding said passage, a recoil valve in said piston provided with a central opening, spring means in said piston acting on said recoil valve to maintain the same seated on said valve seat with a predetermined spring load, a tubular linearly movable piston rod connected centrally to one end of said piston and communicating with said central passage therein and provided with ports communicating with said working cylinder and spaced longitudinally of the cylinder from said valve seat and said recoil valve and said one end of said piston, said piston rod slidably projecting through said first closure means, said piston radially outwardly of said central passage having piston impact passage means extending therethrough, spring pressed piston impact valve means closing said piston impact passage means, and a fluid metering element centrally fixed in said working cylinder and extending longitudinally the full length thereof and coaxially with substantial clearance through said central passage in said piston and said central opening in said recoil valve and into said piston rod, said piston and said element being linearly relatively movable, said element cooperating with said central opening in said recoil valve and having fluid passage means stationary relative to said element providing independently of the seated or unseated condition of said recoil valve for passage through said central opening of a maximum volume of hydraulic fluid from the working cylinder at one side of said piston to the working cylinder at the opposite side thereof when said piston is in a predetermined position in said working cylinder and for such passage therethrough of a gradually diminishing volume when said piston moves in said working cylinder in either direction from said predetermined position, whereby the shock absorber's characteristics produced under the control of said recoil valve and said piston impact valve means are supplemented and altered regardless of the seated condition of said valve or said valve means and in accordance with the position and displacement of said piston in said working cylinder.

2. A direct double acting hydraulic shock absorber as defined in claim 1 wherein a metering ring is mounted in said central passage in said piston intermediate said recoil valve and said piston rod ports and the inner circumference of said metering ring is of a diameter such as to provide a predetermined clearance between it and said fluid metering element when said piston is in said predetermined position in said working cylinder.

3. A direct double acting hydraulic shock absorber as defined in claim 1 wherein said fluid metering element is a tube.

4. A direct double acting hydraulic shock absorber as defined in claim 1 wherein said fluid metering element is a tube and said tube has a free sliding fit in said central opening in said recoil valve and is provided with a longitudinally extending slit.

5. A direct double acting hydraulic shock absorber as defined in claim 1 wherein said fluid metering element is a tube provided with a longitudinally extending slit of predetermined constant width which when said piston is in said predetermined position in said working cylinder has equal length portions on opposite sides of said recoil valve.

6. A direct double acting hydraulic shock absorber as defined in claim 1 wherein said fluid metering element is a tube provided with means disposed on opposite sides of said recoil valve in longitudinally extending portions of said tube and placing the interior of said tube in communication with said working cylinder on opposite sides of said piston, one end of said tube communicating with a relief port while a spring pressed relief valve is provided which normally closes said relief port.

7. A direct double acting hydraulic shock absorber as defined in claim 1 wherein said fluid metering element is a tube provided on opposite sides of said recoil valve with means in longitudinally extending portions of said tube placing the interior of said tube in communication with said working cylinder, said central passage in said piston and the interior of said piston rod; said tube having its end adjacent said first closure means closed and its opposite end provided with a constantly open passage in communication with said reservoir.

8. A direct double acting hydraulic shock absorber as defined in claim 1 wherein said fluid metering element is a rod having cylindrical portions at its opposite ends and conical portions extending from said cylindrical portions and uniting at their minimum diameter ends, which minimum diameter ends are located with a predetermined clearance in the central opening in said recoil valve when said piston is in said predetermined position in said working cylinder.

9. A direct double acting hydraulic shock absorber as defined in claim 8 wherein a metering ring is mounted in said central passage in said piston intermediate said recoil valve and said piston rod ports and the inner circumference of said metering ring is of a diameter such as to provide a predetermined clearance between it and the minimum diameter ends of said conical portions of said rod when said piston is in said predetermined position in said working cylinder, said ring and rod cooperatively providing a supplemental metering arrangement when said piston moves in either direction from said predetermined position.

10. A direct double acting hydraulic shock absorber as defined in claim 8 wherein said piston is provided with a counterbore coaxial with said central passage and with a disk having a central aperture of predetermined size secured to said piston at the outer end of said counterbore, said aperture and said rod providing a supplemental metering arrangement when said piston moves in either direction from said predetermined position.

11. A direct double acting hydraulic shock absorber as defined in claim 1 wherein said fluid metering element is a tube provided with longitudinally spaced ports disposed on opposite sides of said recoil valve when said piston is in said predetermined position in said working cylinder.

12. A direct double acting hydraulic shock absorber as defined in claim 11 wherein an equal number of said ports in said tube are disposed on each side of said recoil valve when said piston is in said predetermined position in said working cylinder.

13. A direct double acting hydraulic shock absorber comprising a working cylinder, an outer cylinder providing a reservoir, first closure means closing one end of said working cylinder and said outer cylinder, second closure means closing the other end of said outer cylinder and of said working cylinder, impact and replenishing valve controlled passage means between said working cylinder and said reservoir, a piston reciprocable in said working cylinder and having a central passage therethrough and an annular valve seat intermediate the opposite ends of said piston and surrounding said passage, a recoil valve in said piston provided with a central opening, spring means in said piston maintaining said recoil valve seated on said valve seat with a predetermined spring load, a tubular piston rod connected centrally no one end of said piston and communicating with said central passage therein and provided with ports communicating with said working cylinder and spaced longitudinally of the cylinder from said valve seat and said recoil valve and said one end of said piston, said piston rod projecting through said first closure means, said piston radially outwardly of said central passage having piston impact passage means extending therethrough, spring pressed piston impact valve means closing said piston impact passage means, a fluid metering element centrally fixed in said working cylinder and extending longitudinally substantially the full length thereof and coaxially with substantial clearance through said central passage in said piston and through said central opening in said recoil valve and into said piston rod, said element cooperating with said central opening in said recoil valve and having fluid passage means stationary relative to said element providing independently of the seated or unseated condition of said recoil valve for passage through said central opening of a maximum volume of hydraulic fluid from the working cylinder at one side of said piston to the working cylinder at the opposite side thereof when said piston is in a predetermined position in said working cylinder and for such passage through of a gradually diminishing volume of hydraulic fluid when said piston moves in said working cylinder in either direction from said predetermined position, whereby the shock absorbing functional characteristics produced under the control of said recoil valve and said piston impact valve means are supplemented and altered regardless of the seated or unseated condition of said valve or said valve means in accordance with the position and displacement of said piston in said working cylinder, means at both ends of said tube each provided with a relief port, and spring pressed relief valves operatively associated with said last named means and normally closing said relief ports.

References Cited in the file of this patent

UNITED STATES PATENTS

| 461,347 | Krone | Oct. 13, 1891 |
| 1,635,284 | Lomar | July 12, 1927 |
| 2,053,053 | Swalm | Sept. 1, 1936 |
| 2,171,827 | Elliott | Sept. 5, 1939 |
| 2,243,280 | Kyle | May 27, 1941 |
| 2,244,501 | Pierce | June 3, 1941 |
| 2,559,633 | Katz | July 10, 1951 |
| 2,626,685 | Brundrett | Jan. 27, 1953 |
| 2,976,032 | Sampietro | Mar. 21, 1961 |

FOREIGN PATENTS

| 556,148 | Great Britain | Sept. 22, 1943 |